Figure 1:
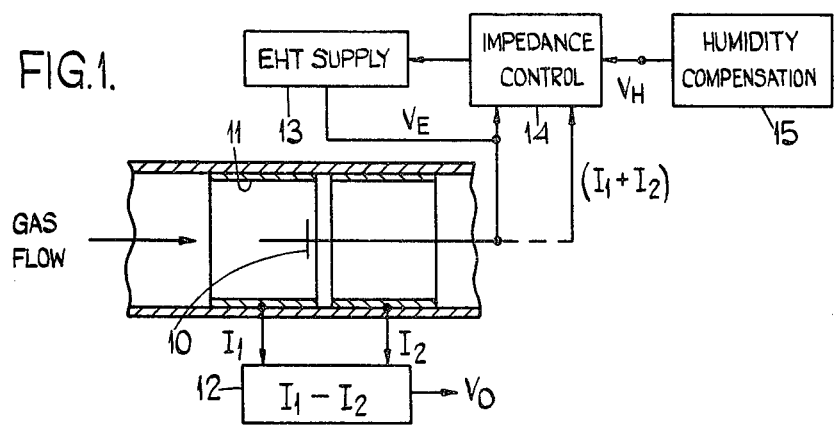

United States Patent [19]

Read

[11] 4,144,750
[45] Mar. 20, 1979

[54] GAS FLOW TRANSDUCERS AND I.C. ENGINE CONTROL SYSTEMS INCORPORATING SUCH TRANSDUCERS

[75] Inventor: Martin A. Read, Redditch, England

[73] Assignee: Lucas Industries Limited, Birmingham, England

[21] Appl. No.: 753,111

[22] Filed: Dec. 22, 1976

[30] Foreign Application Priority Data

Jan. 13, 1976 [GB] United Kingdom ............... 1118/76

[51] Int. Cl.$^2$ .............................................. G01F 1/56
[52] U.S. Cl. ..................................... 73/194 F; 73/113
[58] Field of Search ................. 73/194 F, 113, 119 A, 73/336; 123/32 EJ

[56] References Cited

U.S. PATENT DOCUMENTS 4,052,964  10/1977  Moore ............................... 73/194 F Primary Examiner—Anthony V. Ciarlante
Attorney, Agent, or Firm—Ladas, Parry, Von Gehr, Goldsmith & Deschamps

[57] ABSTRACT

An ion discharge type gas flow meter with an impedance control determining the total discharge current includes a humidity compensation circuit which varies the impedance control to compensate for changes in humidity.

4 Claims, 8 Drawing Figures

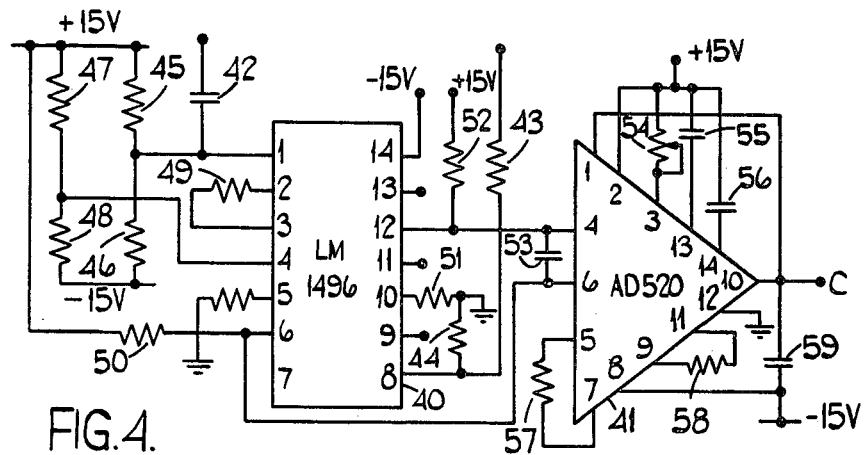
FIG. 4.  PHASE DETECTOR
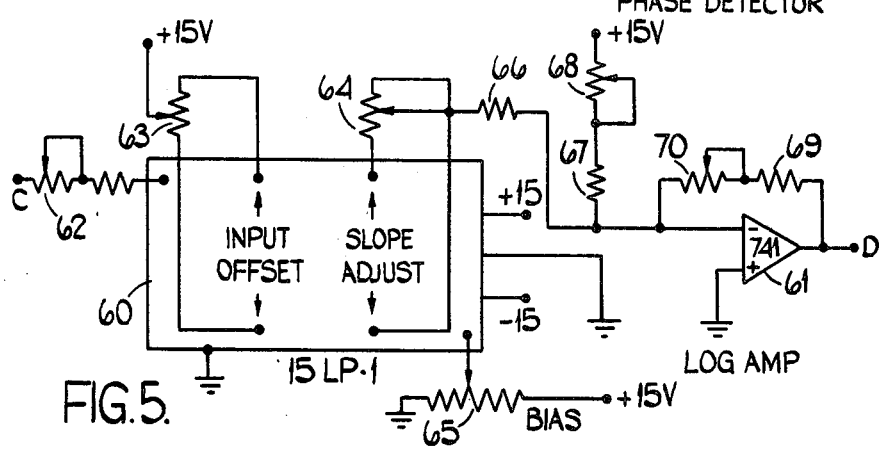
FIG. 5.  LOG AMP
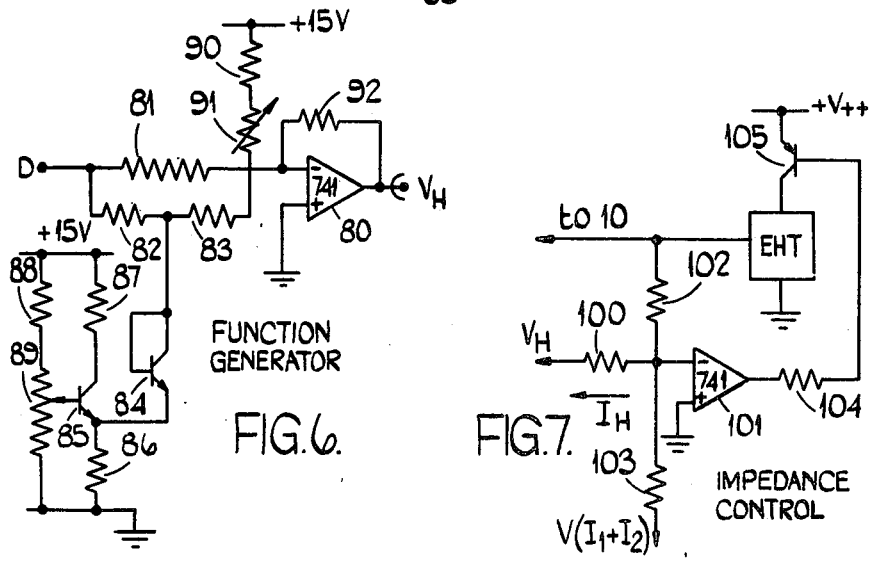
FIG. 6.  FUNCTION GENERATOR
FIG. 7.  IMPEDANCE CONTROL

GAS FLOW TRANSDUCERS AND I.C. ENGINE CONTROL SYSTEMS INCORPORATING SUCH TRANSDUCERS

This invention relates to gas flow transducers and i.c. engine control systems (particularly fuel injection systems) incorporating such transducers.

It is already known to measure gas mass flow by establishing a corona discharge between an ion discharge electrode and extended collecting electrode means spaced from the electrode by a gap through which the gas flows. The total discharge current is usually maintained constant and the difference between the currents flowing to two spaced portions of the extended electrode means is then a measure of the mass flow. In fact, however, the current difference also depends on the humidity expressed as percent by weight of the gas and for scientific measurements, a gas mass flow meter operating as above described is usually supplied with a correction table giving correction factors for different humidity levels.

Clearly such an arrangement is unsuitable for any control system in which it is required to control some process parameter in accordance with gas mass flow, as is the case in a fuel injection control for an i.c. engine. In this case it is desirable for humidity changes to be compensated for automatically and it is accordingly one object of the invention to provide a gas mass flow transducer of the type referred to above with a convenient form of automatic humidity compensation.

According to the invention, a gas mass flow transducer comprises the combination of a gas flow passage, an ion discharge electrode in said passage, extended ion collecting electrode means in said passage spaced from the discharge electrode, said extended electrode means having output terminals connected to portions of the extended electrode means spaced longitudinally of the passage, high voltage supply means for supplying discharge current to the discharge electrode, means sensitive to the humidity of a gas flowing through said passage, means controlled by said humidity sensitive means for varying the resistance of the discharge as a function of humidity and means connected to said output terminals for producing an output signal corresponding to the difference between the currents flowing from said output terminals.

According to another aspect of the invention there is provided an i.c. engine control system comprising a transducer as defined above in the air intake of the engine and a control device connected to said transducer and controlling an engine function in accordance with the output signal thereof.

Figure 2:
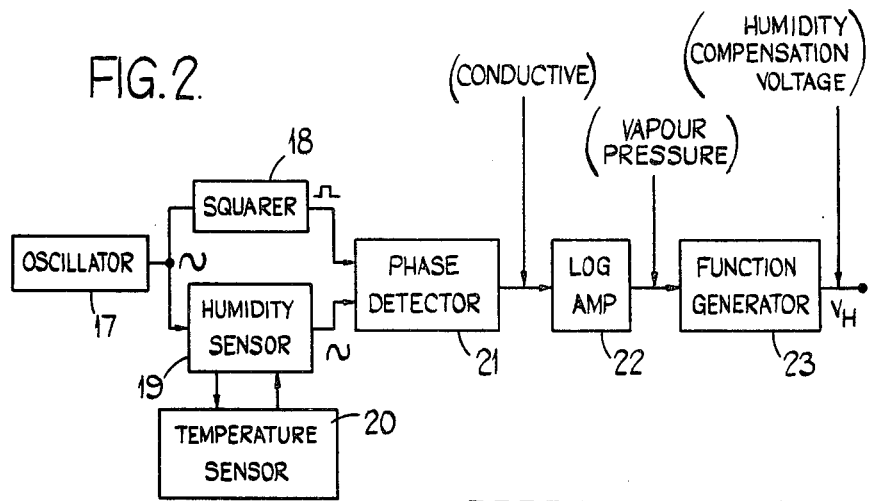
Figure 8:
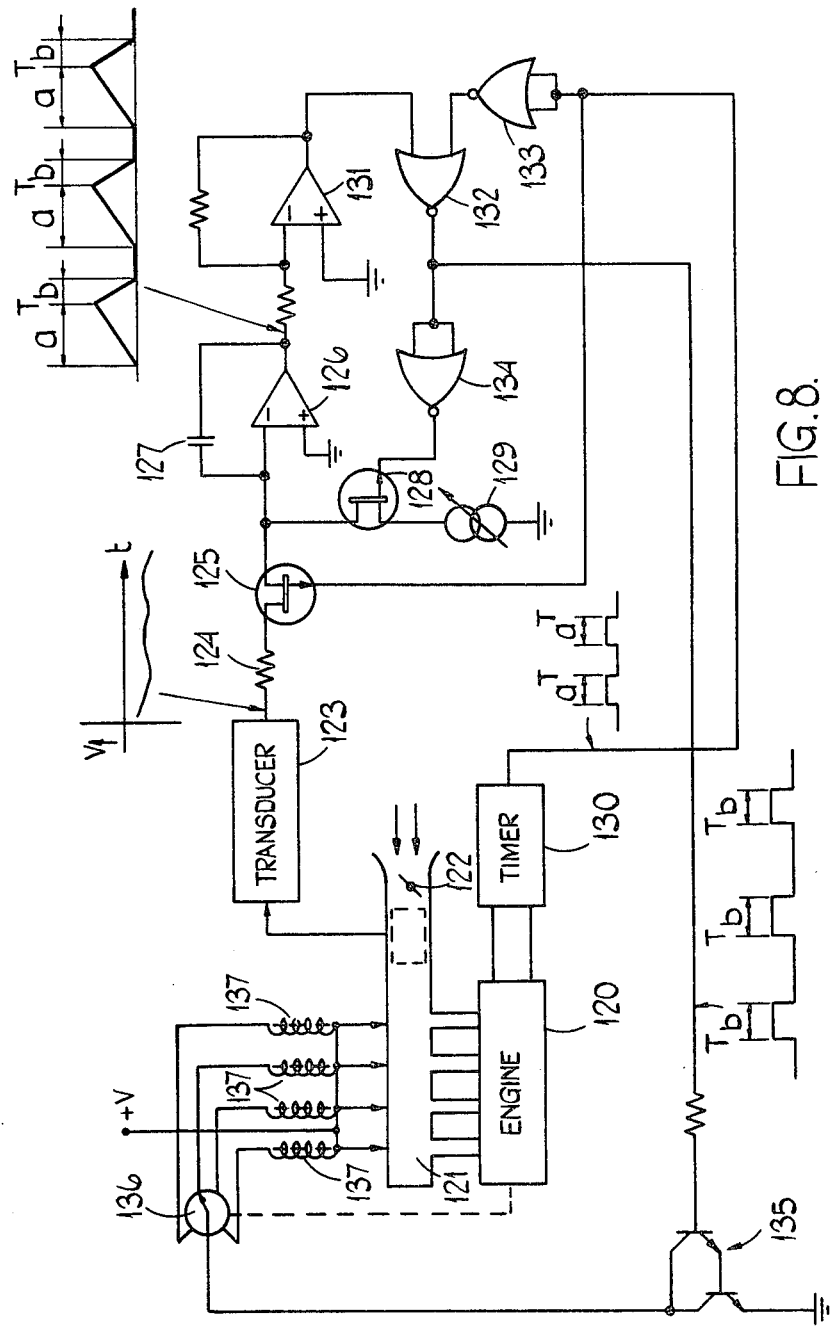

In the accompanying drawings:

FIG. 1 is a block diagram of an example of a transducer in accordance with the invention, FIG. 2 is a block diagram for a humidity compensation circuit forming part of the transducer, FIGS. 3 to 6 are circuit diagrams of various parts of the humidity compensation circuit, FIG. 7 is a circuit diagram of a high voltage supply impedance control of the transducer, and FIG. 8 is a schematic diagram showing an example of the application of the transducer of FIGS. 1 to 7 to an i.c. engine fuel injection control.

Referring firstly to FIG. 1 the transducer includes a discharge electrode 10 supported coaxially within an extended collecting electrode means 11. The electrode means 11 is of circular cylindrical tubular form and may either be formed of resistive material or divided into two or more axially spaced electrically isolated sections. In either event two output terminals are connected to opposite ends of the collecting electrode means 11 and these output terminals are connected to a current difference computing circuit 12 of any known configuration which produces an output voltage proportional to the difference between the currents flowing from the two terminals.

The current supplied to the discharge electrode 10 by a high voltage supply 13 is controlled by an impedance control circuit 14. In known gas mass flow measuring devices the impedance control circuit 14 is designed to maintain a fixed constant discharge resistance and in these circumstances the current difference signal obtained from the circuit 12 is directly proportional to gas mass flow for constant humidity conditions, but varies with humidity. To overcome this humidity variation, the transducer includes a humidity compensation circuit 15 which provides an input signal to the impedance control circuit 14 so as to set the discharge resistance to a level which is determined by the humidity of the gas passing through the transducer.

In FIG. 2 it will be seen that the humidity compensation circuit 15 comprises an oscillator 17 which produces a sinusoidal output signal which is applied to a squarer circuit 18 which produces a square wave output substantially in phase with the sinusoidal output of the oscillator. The sinusoidal output of the oscillator is also applied to a humidity sensor 19. This sensor 19 consists basically of an aluminium strip substrate anodised on one side to provide an aluminium oxide layer about $20\mu$ thick. A vacuum deposited porous gold layer overlies the oxide layer. The temperature of the substrate is controlled by means of an inter-digitated array of nickel temperature sensing elements and nickel heating elements attached to the opposite side of the aluminium strip. The sensing and heating elements are connected to a temperature control 20. A humidity sensor as above described is available from H. Tinsley & Company Limited, who market it as their Torry Hygrometer Probe, Type 5809. Such a sensor measures water vapour partial pressure, which, over the small pressure range to which the sensor is here being subjected, is an adequate representation of humidity as expressed as percent by weight.

The sensor described has a parallel conductance and a parallel capacitance between the substrate and the gold layer, both of which parameters vary as functions of humidity. In the present case the parallel conductance is measured and used as the control parameter. To this end the sinusoidal signal referred to is passed through the sensor and it is ensured that there is a minimal d.c. level across the aluminium oxide layer to avoid polarization. It is found that there is a good linear relationship between the log of the parallel conductance $G_p$ and the vapour pressure.

The signals from the sensor and the squarer are applied to a phase detector circuit 21, the output of which is a voltage signal proportional to the parallel conductance $G_p$ of the sensor. To obtain a humidity signal the output of the phase detector 21 is applied to a log amplifier 22, the output of which is applied to a function generation 23 to obtain a control signal which varies appropriately with humidity to allow compensation to be made.

Figure 3:
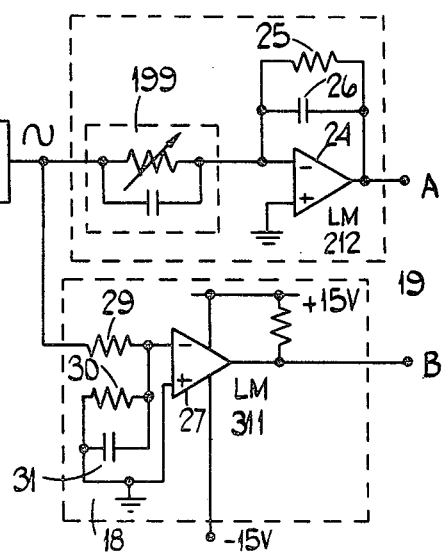

Turning now to FIG. 3, there is shown therein more detail of the squarer and humidity sensor circuits. The sensor element 19a in fact connects the oscillator output to the inverting input terminal of an operational amplifier 24 connected as an integrator. The non-inverting input terminal of the amplifier 24 is grounded and its output terminal is connected back to its input terminal by a resistor 25 and capacitor 26 in parallel.

The squarer 18 consists of a voltage comparator 27 having its non-inverting input terminal grounded and its output terminal connected by a resistor 28 to the $V_{cc}$ rail (at +15V). The inverting input terminal of the amplifier 27 is connected by a resistor 29 to the oscillator output terminal, and also, via a resistor 30 and capacitor 31 in parallel to ground.

FIG. 4 shows the phase detector 21 which includes an integrated circuit balanced modulator/demodulator device 40 type LM1496 (manufactured by National Semiconductor) and a low drift differential amplifier 41 type AD520 (manufactured by Analog Devices). The two inputs to the device 40 are applied to pins 1 and 8 of the integrated circuit, the output of amplifier 24 being coupled by a capacitor 42 to pin 1 and the output of the amplifier 27 being coupled by a resistor 43 to pin 8. A resistor 44 connects pin 8 to ground and a resistive potential divider 45, 46 connected between the +15V and −15V rails has its common point connected to pin 1 to provide the required bias. A further potential divider 47, 48 between the ±15V rails has its common point connected to pin 4 and pins 2 and 3 are interconnected by a resistor 49. Pin 5 is grounded via a resistor 5 and pin 6 is connected by a load resistor 50 to the +15V rail and also to one input terminal (pin 6) of the differential amplifier. Pin 10 is grounded via a resistor 51 and pin 12 is connected by a load resistor 52 to the +15V rail and is also connected to the other input terminal (pin 4) of the differential amplifier 41. Pin 14 is connected to the −15V rail and pins 9, 11 and 13 are left open circuit. The device 40 operates to provide an output voltage between pins 6 and 12 which is effectively a product of the input voltages applied at pins 1 and 8. Thus if the two input signals exactly are in phase of 180° out of phase (one being square and the other sinusoidal) the differential output will be a full wave rectified signal and if they are 90° out of phase the differential output will be a waveform which is symmetrical about $\Delta V=0$. Thus there is a d.c. component in the differential output signal which is a positive maximum when the signals are in phase, zero when the phase difference is 90° and a negative maximum when the signals are 180° out of phase. A capacitor connected across pins 6 and 12 removes the a.c. component and leaves this d.c. component, whose amplitude is proportional to the conductance of the sensor 19a.

The differential amplifier device 41 has pins 1 and 10 connected to the output terminal C, pin 3 connected via a variable resistor 54 to the +15V rail, pins 13 and 14 connected via capacitors 55 and 56 to the +15V rail and pin 2 connected directly to the +15V rail. Pin 5 is connected to pin 7 by a resistor 57 and pins 9 and 11 are likewise interconnected by a resistor 58. Pin 8 is connected to the −15V rail and a capacitor 59 connects the output terminal C to the −15V rail.

Turning now to FIG. 5, the log amplifier includes a commercially available module 60 type 15 LP-1 (manufactured by Ancom) and an operational amplifier 61 connected to apply gain and zero offset as required. Four variable resistors 62, 63, 64 and 65 are used in conjunction with the module 60, resistor 62 being used to couple the output of amplifier 41 to the input of the module. The resistor 63 is connected as a potentiometer between two input offset adjustment terminals of the module and has its variable input connected to the +15V rail. The resistor 64 is connected as a variable resistor between two output terminals of the module and its variable point is the output terminal of this part of the circuit. The resistor 65 provides bias adjustment and is connected between the +15V rail and ground with its variable point connected to a bias terminal of the module.

The variable point of resistor 64 is connected by a resistor 66 to the inverting input terminal of the amplifier 61, the non-inverting input terminal of which is grounded. The inverting input terminal is also connected to the +15V rail by a resistor 67 and a variable resistor 68 in series. Feedback from the output terminal D to the inverting input terminal is provided by a resistor 69 and a variable resistor 70 in series.

The function generator 23 is shown in detail in FIG. 6 and is, in fact, an operational amplifier 80 operating in the inverting mode and provided with an input circuit which brings about a change in gain at a predetermined d.c. input voltage. The output terminal D of the amplifier 61 is connected by a resistor 81 to the inverting input terminal of amplifier 80, the non-inverting input terminal of which is grounded. A pair of resistors 82, 83 in series are connected in parallel with the resistor 81 and a diode connected transistor 84 connects the common point of resistors 82, 83 to the emitter of a transistor 85, which emitter is also connected to ground via a resistor 86. The collector of the transistor 85 is connected to the +15V rail by a resistor 87. A resistor 88 is connected in series with a potentiometer 89 between the +15V rail and ground and the variable point of the potentiometer is connected to the base of the transistor 85. A pull-up resistor 90 in series with a variable resistor 91 connects the inverting input terminal of the amplifier 80 to the +15V rail and feedback is provided by a resistor 92 connected between the output terminal of the amplifier 80 and its inverting input terminal. When the input to the circuit of FIG. 6 is at zero volts, the output will be at a positive level determined by the resistors 90, 91. As the input voltage increases the output voltage decreases initially steeply since transistor 84 will be reversed biased but subsequently at a shallower slope after the voltage at the junction of resistors 82, 83 exceeds that set at the emitter of transistor 85 by potentiometer 89.

In the impedance control shown in FIG. 7 the output of the circuit of FIG. 6 is applied via a resistor 100 to the inverting input terminal of an operational amplifier 101 which has its non-inverting input terminal grounded. The inverting input terminal is also connected to the common point of a resistor chain 102, 103 connecting the high voltage supply terminal to a voltage source at a negative voltage proportional to the total current $I_1 + I_2$, the resistor 102 having a very high ohmic value e.g. 1 Gohm.

The output of the amplifier 101 thus goes high when the sum of the contributions from the humidity signal and the high voltage output is higher than that from the voltage source $V(I_1 + I_2)$. The output of the amplifier 101 is connected by a resistor 104 to the base of a p-n-p transistor 105 which is part of the high voltage control and in the circumstance described above this causes the voltage to fail. The amplifier 101 thus acts to control the output voltage so that the discharge has an effective resistance of $V/I_1 + I_2$ which is a function of $V_H$.

Turning now to FIG. 8, this shows, in an extremely simplified form, a fuel injection control for an i.c. engine 120 which has an air intake manifold 121 controlled by a throttle valve 122. The electrodes of the transducer are situated in the air intake, as in the humidity sensor element. The transducer circuit 123 which is as described above has its $V(I_1 - I_2)$ output connected via a resistor 124 and an f.e.t. switch 125 to the inverting input terminal of an operational amplifier 126 connected as an integrator with a feedback capacitor 127. For discharging the capacitor 127 there is a further f.e.t. switch 128 connecting the inverting input terminal of amplifier 126 to earth via a constant current source 129 which may be controlled by one or more additional engine parameters if desired.

The f.e.t. switches are controlled by a timing device 130 driven by the engine and providing output pulses which commence and terminate at fixed crankshaft positions. The timer 130 controls the switch 125 directly and the switch 128 via a logic circuit. This circuit includes an inverting amplifier 131 connected to the output terminal of amplifier 126 and connected (via any necessary interfacing components) to one input terminal of a NOR gate 132 which has a second input from a NOR gate 133 connected as a logical inverter and controlled by the timer 130. The output of NOR gate 132 controls a NOR gate 134 connected as an inverter and the output of gate 134 controls the switch 128. It is to be noted that various biasing components associated with the f.e.t. switches 125, 128 are omitted from the drawing for the sake of clarity.

In addition the gate 132 drives a Darlington pair 135 connected via a distributor 136 (which may be electronic or mechanical) to a plurality of injection valves 137.

Whilst the output of the timer 130 is high the f.e.t. switch 125 is conductive and the f.e.t. switch 128 is non-conductive. The signal from the transducer 123 is thus integrated over a fixed crankshaft angle, i.e. until the output of the timer 130 goes low. Switch 128 now conducts and switch 125 is turned off. The capacitor 127 is now discharged at a constant rate via current source 129 and during such discharge Darlington pair 135 is conductive to cause an appropriate one of the injection valves to open. When the capacitor 127 is discharged the output of amplifier 131 goes positive and blocks gate 132, thereby switching off switch 128 and the Darlington pair.

The quantity of fuel injected per cycle is directly proportional to the voltage acquired by the capacitor 127 during the integration period, which is in turn directly proportional to the total mass of air flowing into the engine during the integration period.

I claim:

1. A gas mass flow transducer comprising the combination of a gas flow passage, an ion discharge electrode in said passage, extended ion collection electrode means in said passage spaced from the discharge electrode, said extended electrode means having output terminals connected to portions of the extended electrode means spaced longitudinally of the passage, high voltage supply means for supplying discharge current to the discharge electrode, means sensitive to the humidity of a gas flowing through said passage, means controlled by said humidity sensitive means for varying the resistance of the discharge as a function of humidity and means connected to said output terminals for producing an output signal corresponding to the difference between the currents flowing from said output terminals.

2. A transducer as claimed in claim 1 in which the means controlled by the humidity sensitive means includes humidity signal generating means producing signal linearly related to humidity, discharge impedance control circuit and a function generator circuit connecting the humidity signal generating means to the impedance control so as to render the output signal independent of humidity.

3. A transducer as claimed in claim 2 in which the humidity sensitive means comprises a humidity sensitive element in the form of an aluminium oxide layer interposed between a substrate and a porous layer, and means controlling the temperature of said substrate, the logarithm of the parallel conductance of the oxide layer varying linearly with the humidity.

4. A transducer as claimed in claim 3 in which the humidity signal generating means comprises the combination of an oscillator, means for comparing the phase of the oscillator output with the phase of a signal derived by applying the oscillator output to said humidity sensitive element, and producing a d.c. output dependent on the phase difference and a logarithmic amplifier connected to amplify said d.c. output to produce said signal varying linearly with humidity.

* * * * *